(12) United States Patent
Zhang

(10) Patent No.: US 10,933,365 B2
(45) Date of Patent: Mar. 2, 2021

(54) DECONTAMINATING COLUMN FOR ON-LINE REPLACING ADSORPTION MATERIAL AND GLOVE BOX

(71) Applicant: VIGOR GAS PURIFICATION TECHNOLOGIES, INC., Jiangsu (CN)

(72) Inventor: Delong Zhang, Jiangsu (CN)

(73) Assignee: VIGOR GAS PURIFICATION TECHNOLOGIES, INC., Jiangsu (CN)

( * ) Notice: Subject to any disclaimer, the term of this patent is extended or adjusted under 35 U.S.C. 154(b) by 200 days.

(21) Appl. No.: 16/081,607

(22) PCT Filed: Nov. 29, 2016

(86) PCT No.: PCT/CN2016/107580
§ 371 (c)(1),
(2) Date: Aug. 31, 2018

(87) PCT Pub. No.: WO2017/166838
PCT Pub. Date: Oct. 5, 2017

(65) Prior Publication Data
US 2019/0099709 A1    Apr. 4, 2019

(30) Foreign Application Priority Data

Mar. 31, 2016    (CN) .......................... 2016 1 0200958

(51) Int. Cl.
*B01D 53/02*    (2006.01)
*B01D 53/04*    (2006.01)
(Continued)

(52) U.S. Cl.
CPC ..... *B01D 53/0423* (2013.01); *B01D 53/0407* (2013.01); *B01D 53/0446* (2013.01);
(Continued)

(58) Field of Classification Search
CPC .......... B01D 2259/40084; B01D 2259/40088; B01D 2259/45; B01D 2259/4533;
(Continued)

(56) References Cited

U.S. PATENT DOCUMENTS

| | | | | |
|---|---|---|---|---|
| 6,019,823 A * | 2/2000 | Tischler | ............. | B01D 53/0415 206/0.7 |
| 6,083,298 A * | 7/2000 | Wang | ................. | B01J 20/28019 95/99 |
| 2007/0157804 A1* | 7/2007 | McManus | ............... | F17C 11/00 95/114 |

FOREIGN PATENT DOCUMENTS

| | | |
|---|---|---|
| CN | 1410164 A | 4/2003 |
| CN | 202823093 U | 3/2013 |

(Continued)

*Primary Examiner* — Christopher P Jones
(74) *Attorney, Agent, or Firm* — Muncy, Geissler, Olds & Lowe, PC

(57) ABSTRACT

This invention discloses a decontaminating column for on-line replacing adsorption material, and it includes: a tank having an inner tank being used for filling the adsorption material, and one end of the tank being set to be opened; at least one discharging part is being attached to the tank, and an open-close unit by which the adsorption material can be discharged and which is installed between the discharging part and the tank. There is a chamber in the discharging part, which is connected to a gas replacement unit. At the same time, this invention also discloses a glove box. Compared with the existing technology, this invention effectively solves the problems of low efficiency, high manufacturing cost and high maintenance cost generated by decontaminating column replacement mode in the existing technology; In addition, when the decontaminating column is used in the glove box, replacing the adsorption material can ensure that the water oxygen in the glove box is prevented from leaking (Continued)

out and/or the water oxygen outside of the glove box is prevented from penetrating into the box.

10 Claims, 5 Drawing Sheets

(51) Int. Cl.
  *B25J 21/02* (2006.01)
  *B08B 15/02* (2006.01)
(52) U.S. Cl.
  CPC ........ *B01D 53/0454* (2013.01); *B08B 15/026* (2013.01); *B25J 21/02* (2013.01); *B01D 53/0438* (2013.01); *B01D 2259/40084* (2013.01); *B01D 2259/40088* (2013.01); *B01D 2259/45* (2013.01); *B01D 2259/4533* (2013.01)
(58) Field of Classification Search
  CPC ............ B01D 53/0407; B01D 53/0423; B01D 53/0438; B01D 53/0446; B01D 53/0454; B08B 15/026; B25J 21/02
  See application file for complete search history.

(56) References Cited

FOREIGN PATENT DOCUMENTS

| | | |
|---|---|---|
| CN | 104291284 A | 1/2015 |
| CN | 105664662 A | 6/2016 |
| CN | 205495280 U | 8/2016 |
| JP | 2007160153 A | 6/2007 |
| WO | WO-2007/135301 A1 | 11/2007 |

\* cited by examiner

DECONTAMINATING COLUMN FOR ON-LINE REPLACING ADSORPTION MATERIAL AND GLOVE BOX

TECHNICAL FIELD

This invention relates to a decontaminating column used in the field of glove boxes, in particular to a decontaminating column for on-line replacing adsorption material and a glove box.

BACKGROUND TECHNOLOGY

A glove box is widely used in medicine, biology, chemistry and chemical engineering, nuclear energy, lithium electricity, mechanical processing and other high-tech research fields, as well as production and manufacturing processes. The glove box not only provides the anhydrous and anaerobic experimental environment for various scientific research and production, but also offers safety protection to the science researchers, such as, medical biology, anti-bacteria and disease prevention, nuclear energy radiation protection and leakage prevention, as well as poisonous gas prevention of chemistry and chemical engineering, etc.

Currently, in the decontaminating column of the glove box equipment, its internal purification materials should be replaced timely after the adsorption and saturation, otherwise, it will influence the purification performance of decontaminating column. At present, there are three usual replacement modes:

I. Utilize regeneration methods to directly conduct regeneration and recovery for the purification materials in decontaminating column, but this method will spend a long time, occupy the normal operating time and influence scientific research and production efficiency;

II. Prepare two or more decontaminating columns in glove boxes and achieve one-use and one backup or one-use and multiple backup, to improve the work efficiency of replacing decontaminating column. But the decontaminating column is the core part of the glove box and it has a large share, so the manufacturing cost of the glove box is higher;

III. If the manufacturers directly replace the whole decontaminating column, they will dismantle the glove box with a higher maintenance cost, and it will influence the atmosphere purity in the glove box. The atmosphere replacement is needed in the later period, which also influences the work efficiency of the glove box.

Invention Contents

To solve the above technical problems, this invention provides a decontaminating column for on-line replacing adsorption material and a glove box, which can solve the problems of low efficiency, high manufacturing cost and high maintenance cost generated by three modes in the existing technology;

To achieve the above purpose, the technical proposal of this invention is as follows:

Decontaminating column for on-line replacing adsorption material; it includes:

a tank having an inner tank being used for filling the adsorption material and one end of the tank being set to be opened;

at least one discharging part being attached to the tank, and an open-close unit by which the adsorption material can be discharged and which is installed between the discharging part and the tank;

a chamber in the discharging part, which is connected to a gas replacement unit.

The decontaminating column for on-line replacing adsorption material provided by this invention is mainly comprising the tank for filling adsorption material and the discharging part attached to the tank. There is an open-close cover on the tank and an open-close unit between the discharging part and the tank for discharging the adsorption material. Meanwhile, a chamber is set in the discharging part, which communicates with the gas replacement unit. When the adsorption material in the tank is saturated or cannot reach the capability requirements, the empty material bottle is connected to the butt joint opening of the discharging part. After the completion of butting, gas replacement of the material bottles is conducted through gas replacement unit and chamber, and the replaced gas shall be consistent with the gas atmosphere in the chamber. Then, the open-close unit is opened to discharge the used adsorption material, and the open-close unit is closed after the discharging process. Next, a cover on the tank is opened, the activation adsorption material in the material bottle is directly poured into the tank, and it can be used again after covering. The replacement operation of decontaminating column is completed.

Therefore, compared with the existing technology, this invention effectively solves the problems of low efficiency, high manufacturing cost and high maintenance cost generated by decontaminating column replacement mode in the existing technology. In addition, when the decontaminating column is used in the glove box, replacing the adsorption material can ensure that the water oxygen in the glove box is prevented from being leaked out.

On the basis of the above technical proposal, this invention can also make the following improvements:

According to a preferred embodiment, each of both ends of the above tank is connected to one of two discharging parts.

The above preferred proposal is convenient for discharging and loading adsorption material again.

According to a preferred embodiment, the end of the above discharging part is provided with a protective cover at the outside.

Adopting the above preferred proposal has a seal and protection function to the chamber: the first function is to keep the vacuum, and the second function is equal to the protection with two successive doors. It even can be provided with pressure sensor or a gas sensor to detect whether there is a leakage.

According to a preferred embodiment, the above open-close unit is driven by a first drive unit for opening and closing.

Adopting the above preferred proposal can realize the automatic discharging operation.

According to a preferred embodiment, the above open-close unit is a valve.

Adopting the above preferred proposal can be convenient for realizing the quick opening and closing to facilitate discharging.

According to a preferred embodiment, the above chamber communicates with the gas replacement unit through a pipeline.

Adopting the above preferred proposal can be convenient for connecting with gas replacement unit.

According to a preferred embodiment, the above pipeline is provided with a valve.

Adopting the above preferred proposal can be convenient for controlling the gas replacement, namely, it can be closed timely when not conducting the gas replacement to keep the internal atmosphere.

According to a preferred embodiment, the above tank is provided with an gas outlet and an gas inlet.

Adopting the above preferred proposal can cooperate with a circulating fan or other equipment to conduct the circulation of internal atmosphere.

According to a preferred embodiment, the above inner tank is provided with heating unit.

Adopting the above preferred proposal may enable a direct regeneration of the adsorption material within the pipeline.

A Glove box comprises a glove box body and at least one above described decontaminating column for on-line replacing adsorption material.

Because the glove box of this invention adopts the above decontaminating column for on-line replacing adsorption material, the glove box obtained the same technical effect.

In the figures, 1. Tank body; 11. Adsorption material; 12. Cover; 13. Gas inlet; 14. Gas outlet: 15. Heating unit; 2. Discharging part; 21. Open-close unit; 211. The first drive unit; 22. Chamber; 23. Gas replacement unit; 231. Pipeline; 232. Valve; 24. Cover; 3. Decontaminating column; 4. Glove box body; 41. Transition storehouse; 42. Oxygen sensor; 43. Moisture sensor; 44. Circulating fan.

SPECIFIC EMBODIMENTS

The preferred embodiments of this invention will be described with reference to the accompanying figures.

Figure 1:
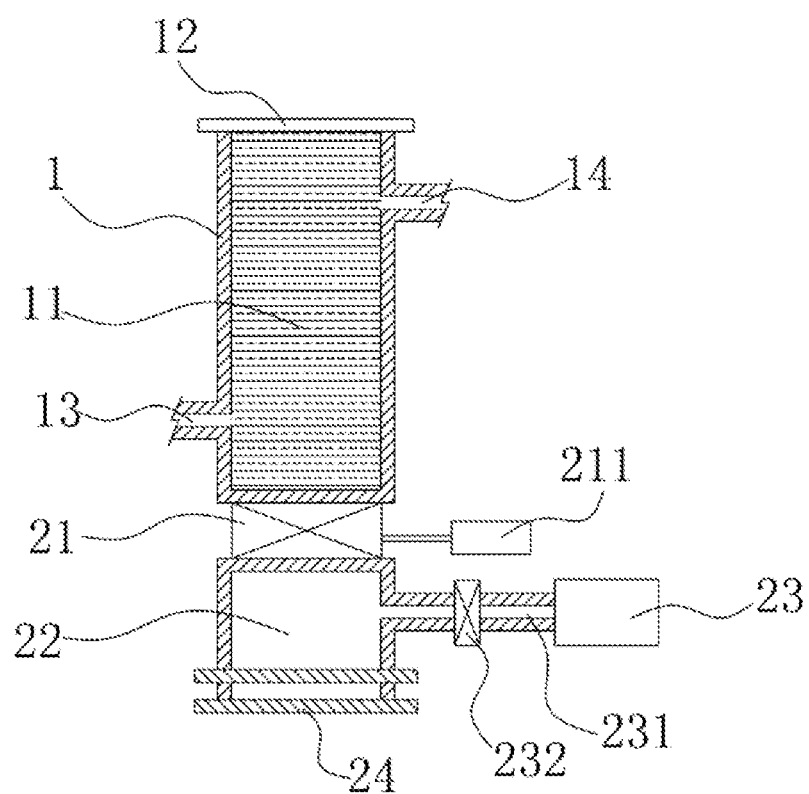
FIG. 1 is the structure diagram of the decontaminating column for on-line replacing adsorption material according to an embodiment of the invention.
Figure 2:
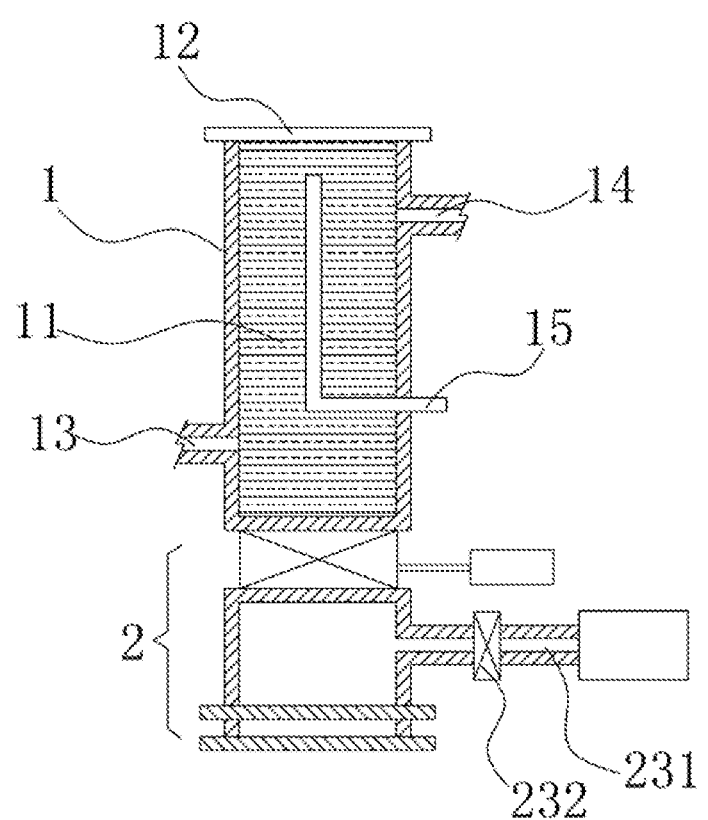
FIG. 2 is the structure diagram of the decontaminating column for on-line replacing adsorption material according to another embodiment of the invention.
Figure 3:
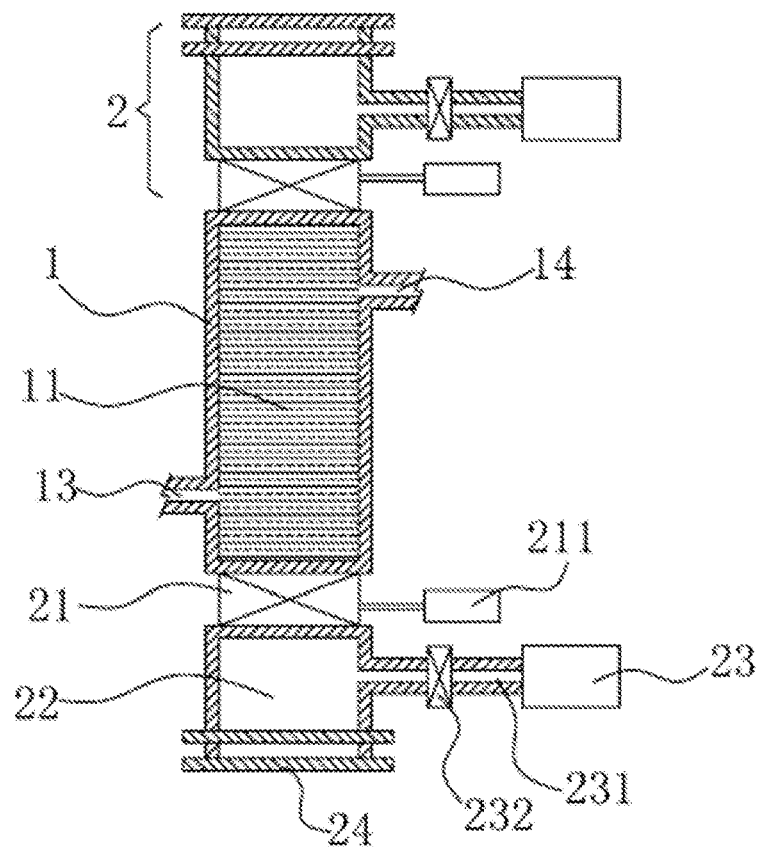
FIG. 3 is the structure diagram of the decontaminating column for on-line replacing adsorption material according to another embodiment of the invention.

To achieve the purpose of this invention, as shown in FIG. 1-3, in some embodiments of the decontaminating column for on-line replacing adsorption material according to this invention, it includes: a tank 1, wherein the inner tank is used for filling the adsorption material 11 and an open-close cover 12 is installed on the tank, namely, one end of the tank 1 is set to be open and the cover 12 can be articulated on the tank 1; a discharging part 2 that is attached to the tank 1 and has an open-close unit 21 through which the adsorption material can discharge and being installed between the discharging part 2 and the tank 1; such open-close unit 21 can be a valve or a cover, etc. Meanwhile, a chamber 22 is provided in the discharging part 2, which communicates with the gas replacement unit 23; such gas replacement unit 23 can be a combination of a pump and a gas source. After the gas in the material bottle is extracted by the pump, the gas source will be replaced with the gas required in the decontaminating column.

The decontaminating column for on-line replacing adsorption material provided by this embodiment comprises mainly the tank for filling adsorption material and the discharging part attached to the tank. There is an open-close cover on the tank and an open-close unit between the discharging part and the tank for discharging the adsorption material. Meanwhile, a chamber is provided in the discharging part, which communicates with the gas replacement unit; When the adsorption material in the tank is saturated or cannot reach the capability requirements, the empty material bottle is connected to the butt joint opening of the discharging part. After the completion of butting, gas replacement of the material bottles is conducted through gas replacement unit and chamber, and the replaced gas shall be consistent with the gas atmosphere in the chamber. Then, the open-close unit is opened to discharge the adsorption material used, and the open-close unit is closed after discharging. Next, a cover on the tank is opened, the activation adsorption material in the material bottle is directly poured into the tank, and it can be used again after covering. The replacement operation of decontaminating column is completed. Therefore, compared with the existing technology, this embodiment effectively solves the problems of low efficiency, high manufacturing cost and high maintenance cost generated by the three decontaminating column replacement modes; In addition, when the decontaminating column is used in the glove box, replacing the adsorption material can ensure that the water oxygen in the glove box is prevented from being leaked out and/or the water oxygen outside of the glove box is prevented from penetrating into the box.

To further improve the implementation effect of this invention, as shown in FIG. 1-2, in some other embodiments of the decontaminating column for on-line replacing adsorption material according to this invention and on basis of the above contents, the above cover 12 and discharging part 2 are provided to each of both opposite ends of the tank 1. Adopting the proposal of implementation mode is convenient for discharging and loading adsorption material again.

To further improve the implementation effect of this invention, as shown in FIG. 3, in some other embodiments of the decontaminating column for on-line replacing adsorption material according to this invention and on basis of the above contents, the opposite both ends of the tank 1 are provided with discharging parts 2 respectively. Adopting the proposal of implementation mode can be convenient for discharging from the both ends of the tank 1.

To further improve the implementation effect of this invention, as shown in FIG. 1-3, in some other embodiments of the decontaminating column for on-line replacing adsorption material according to this invention and on basis of the above contents, the outer ends of the above discharging part 2 can be opened; there can be an openable and closable cover 24 or other means, and the cover 24 forms a protective cover. Adopting the proposal of implementation mode has a seal and protection function for the chamber: the first is to keep the vacuum, and the second is equal to the protection with two successive doors; It even can be connected to a pressure sensor or gas sensor to detect whether there is a leakage.

To further improve the implementation effect of this invention, as shown in FIG. 1-3, in some other embodiments of the decontaminating column for on-line replacing adsorption material according to this invention and on basis of the above contents, the above open-close unit 21 is driven by the first drive unit 211 for opening and closing, and such first drive unit 211 can be a motor or cylinder, etc. Adopting the proposal of implementation mode can realize the automatic discharging operation.

To further improve the implementation effect of this invention, as shown in FIG. 1-3, in some other embodiments of the decontaminating column for on-line replacing adsorption material according to this invention and on basis of the above contents, the above chamber 22 communicates with the gas replacement unit 23 through the pipeline 231. Adopting the proposal of implementation mode can be convenient for connecting with gas replacement unit.

To further improve the implementation effect of this invention, as shown in FIG. 1-3, in some other embodiments of the decontaminating column for on-line replacing adsorption material according to this invention and on basis of the above contents, the above pipeline 231 comprises a valve 232. Adopting the proposal of implementation mode can be convenient for controlling the gas replacement, namely, it can be closed quickly when not conducting the gas replacement to keep the internal atmosphere.

To further improve the implementation effect of this invention, as shown in FIG. 1-3, in some other embodiments of the decontaminating column for on-line replacing adsorption material according to this invention and on basis of the above contents, the above tank 1 comprises an air outlet 13 and an air inlet 14. Adopting the proposal of implementation mode can cooperate with circulating fan and other equipment to conduct the circulation of internal atmosphere.

To further improve the implementation effect of this invention, as shown in FIG. 1-3, in some other embodiments of the decontaminating column for on-line replacing adsorption material according to this invention and on basis of the above contents, the heating unit 15 is provided in the above tank 1. Adopting the proposal of implementation mode can directly regenerate the adsorption material in the pipeline.

Figure 4:
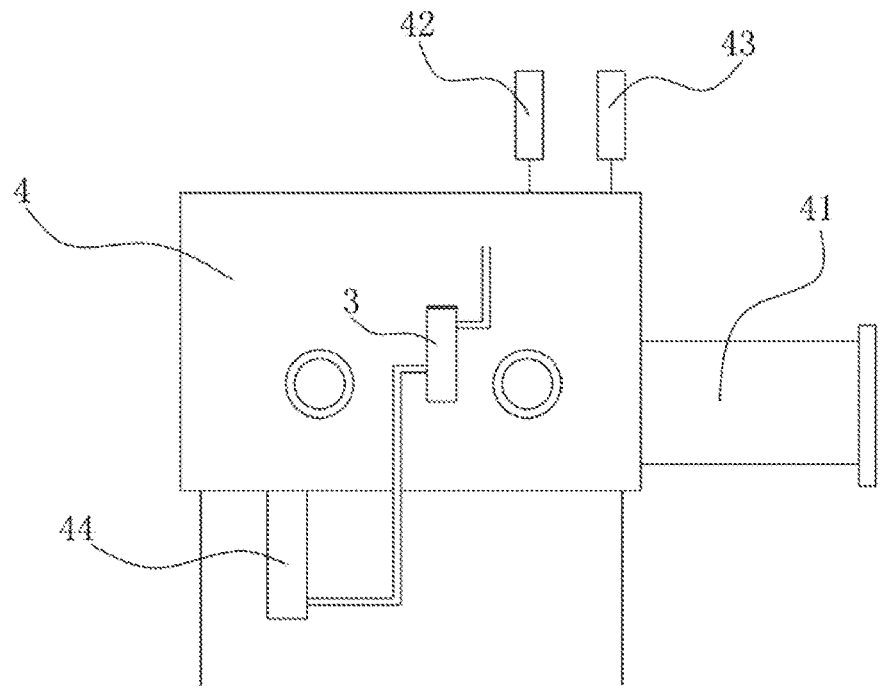
FIG. 4 is the structure diagram of the glove box according to an embodiment of the invention.
Figure 5:
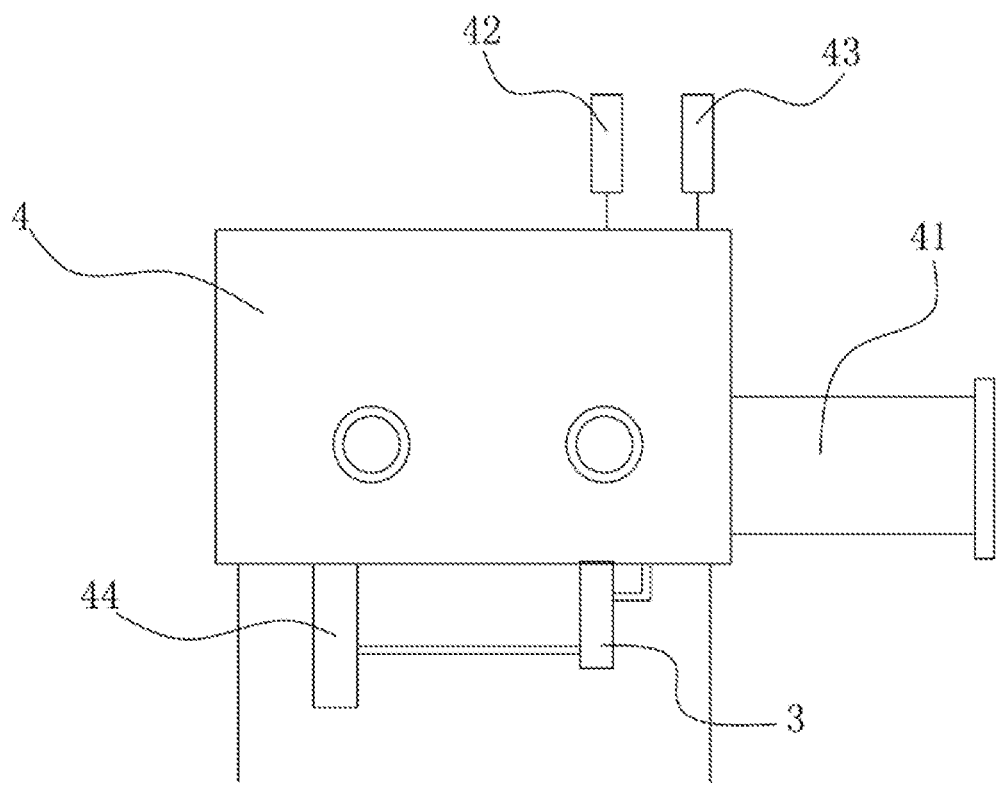
FIG. 5 is the structure diagram of the glove box according to another embodiment of the invention.
Figure 6:
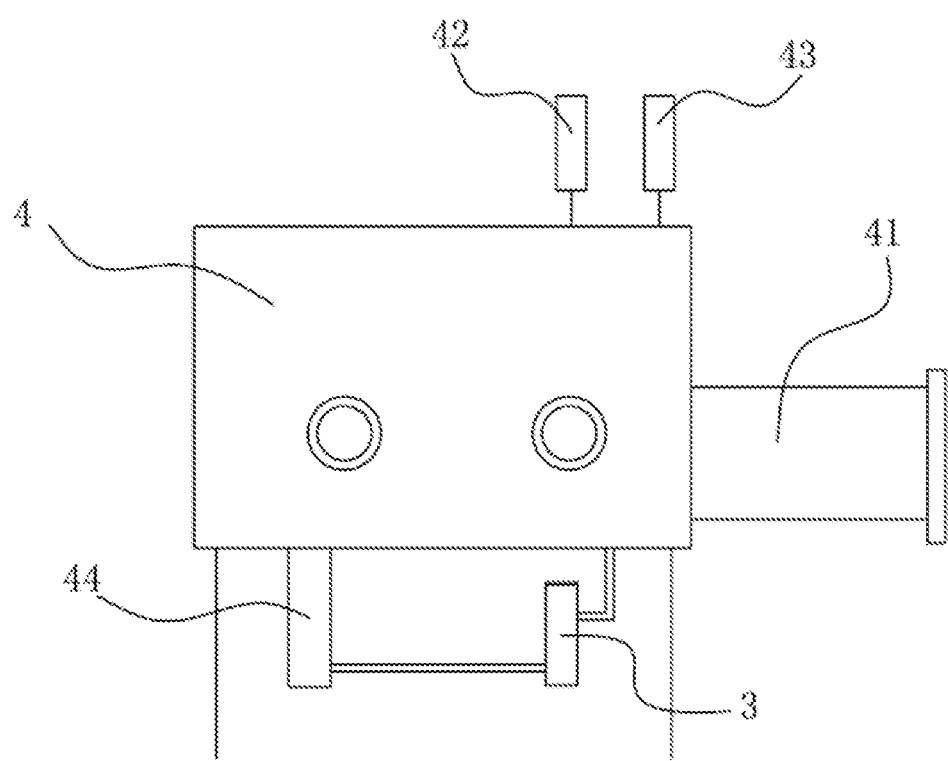
FIG. 6 is the structure diagram of the glove box according to another embodiment of the invention.

To achieve the purpose of this invention, as shown in FIG. 4-6, in some embodiments of the glove box according to this invention, it includes the glove box body 1 and an above decontaminating column 3 for on-line replacing adsorption material. In some cases, multiple decontaminating columns 3 can be provided with the best method of series setting. The glove box body 1 also sets up a transition storehouse 41, oxygen sensor 42, moisture sensor 43 and circulating fan 44. As shown in FIG. 4, the decontaminating column 3 is provided in the glove box body 1; As shown in FIG. 5, the decontaminating column is connected to the shell of the glove box body 1, and the interior of the decontaminating column will communicate with the interior of the glove box body after the cover of decontaminating column 3 is opened. As shown in FIG. 6, the decontaminating column 3 is provided directly outside the glove box body 1; In addition, the half-embedded installation method can be adopted. Because the glove box of this embodiment adopts the above decontaminating column for on-line replacing adsorption material, the glove box obtained the same technical effect.

The above content is only the preferred embodiment of this invention. It should be pointed out that for the ordinary skilled person of the art, several changes and improvements can be made without leaving the basic idea of the present invention, which belongs to the protection scope of this invention.

The invention claimed is:

1. A decontaminating column for on-line replacing of adsorption material including:
   a tank having an inner tank with the adsorption material and one end of said tank being set to be opened;
   at least one discharging part being attached to said tank, and an open-close unit by which the adsorption material can be discharged from the inner tank of the tank and which is installed between said discharging part and said tank;
   a chamber in said discharging part, which is connected to a gas replacement unit.

2. The decontaminating column for on-line replacing of adsorption material according to claim 1, wherein each of two ends of the tank is connected to one of two discharge parts.

3. The decontaminating column for on-line replacing of adsorption material according to claim 1, wherein a protective cover is provided at an end of the at least one discharging part positioned at the outside.

4. The decontaminating column for on-line replacing of adsorption material according to claim 1, wherein said open-close unit is driven by a first drive unit for opening and closing.

5. The decontaminating column for on-line replacing of adsorption material according to claim 1, wherein said open-close unit is a valve.

6. The decontaminating column for on-line replacing of adsorption material according to claim 1, wherein said chamber communicates with said gas replacement unit through a pipeline.

7. The decontaminating column for on-line replacing of adsorption material according to claim 6, wherein said pipeline is provided with a valve.

8. The decontaminating column for on-line replacing of adsorption material according to claim 1, wherein said tank is provided with a gas outlet and an gas inlet.

9. The decontaminating column for on-line replacing of adsorption material according to claim 1, wherein said inner tank is provided with a heating unit.

10. A glove box having a glove box body, wherein said glove box further includes at least one decontaminating column for on-line replacing of adsorption material according to claim 1.

* * * * *